Figures 1, 2, 3:
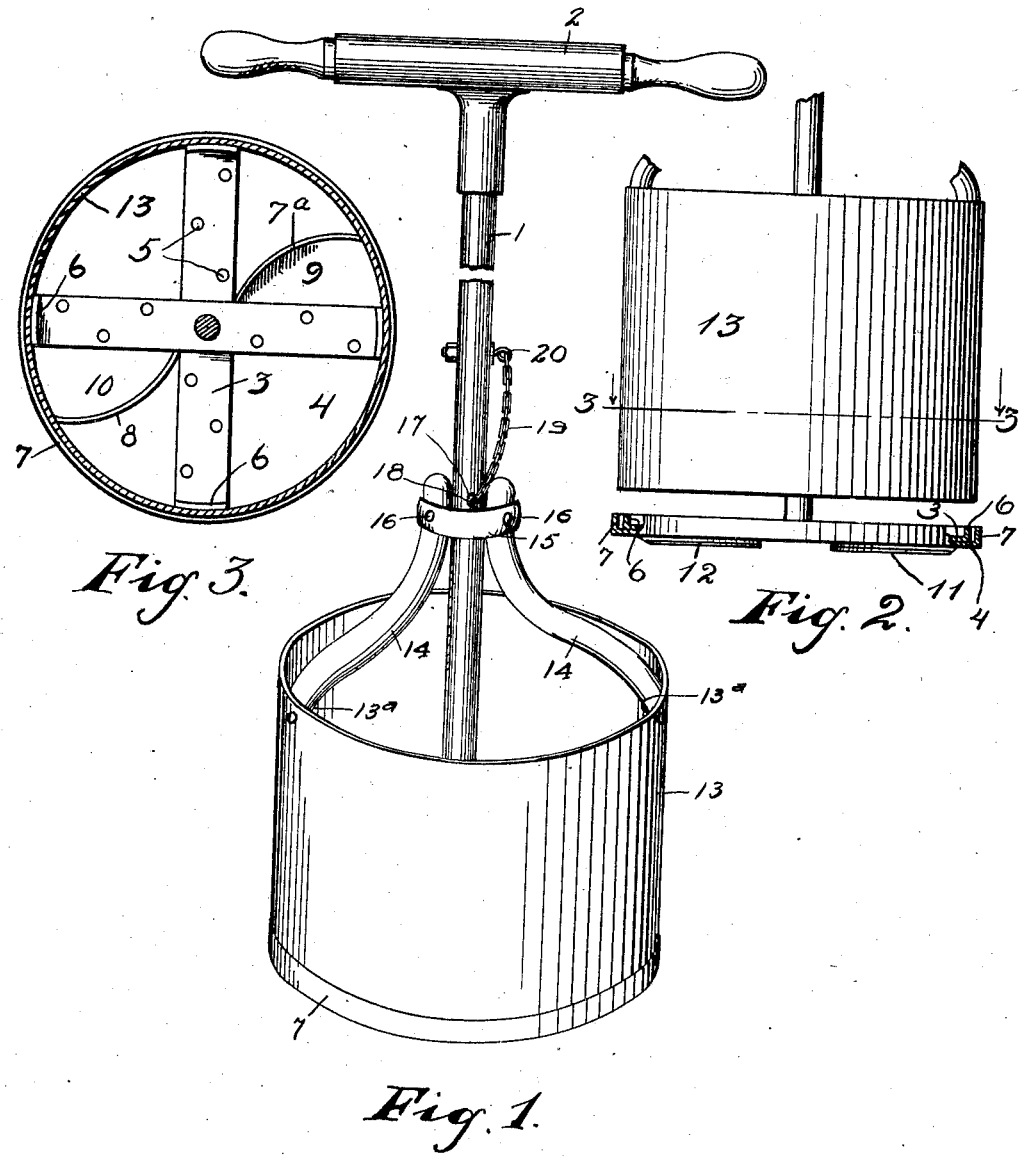

M. E. MILLER.
AUGER APPARATUS.
APPLICATION FILED JAN. 3, 1910.

972,392.

Patented Oct. 11, 1910.

Witnesses

Inventor
Marshall E. Miller,

By C. L. Parker, Attorney

UNITED STATES PATENT OFFICE.

MARSHALL E. MILLER, OF WALKER, MISSOURI.

AUGER APPARATUS.

972,392.  Specification of Letters Patent. Patented Oct. 11, 1910.

Application filed January 3, 1910. Serial No. 536,221.

*To all whom it may concern:*

Be it known that I, MARSHALL E. MILLER, citizen of the United States, residing at Walker, in the county of Vernon and State of Missouri, have invented certain new and useful Improvements in Auger Apparatus, of which the following is a specification.

My invention relates to earth augers, and particularly to a device of this character for boring post holes or shallow wells.

The object of my invention is to provide an earth auger, embodying a receptacle to hold the loosened earth, so that said earth may be readily removed from the hole being bored.

My invention consists generally of cutters or blades, and a removable receptacle coöperating therewith for receiving the loosened earth.

In the accompanying drawings, forming a part of this specification and in which like numerals are employed to designate like parts throughout the same, Figure 1 is a perspective view of the device, Fig. 2 is a fragmentary side view of the same, Fig. 3 is a horizontal cross-sectional view, taken on the line 3—3 of Fig. 2.

In the preferred embodiment of my invention, as illustrated in the drawings, 1 designates a cylindrical stem, which may be made of any desired length, and upon the upper end of which is detachably secured a handle 2. The lower or opposite end of the stem 1 is rigidly secured by any suitable means to the center of strips 3. The strips 3 are arranged at right angles and in superposed relation, and upon the lower sides of the strips 3 is arranged a circular plate 4, which is rigidly secured to said strips 3 by means of rivets 5. The strips 3 are of the same length and have their ends bent upwardly at substantially right angles, as at 6. The circular plate 4 is provided upon its upper side, at the periphery thereof, with a circumferential flange 7, which surrounds the upturned ends 6 and is spaced away therefrom. The circular plate 4 is provided with curved openings 7$^a$ and 8, which result from the stamping of the curved sections 9 and 10 out of said plate 4, for forming bits or cutters. The sections 9 and 10 forming the bits or cutters, are bent downward, as shown in Fig. 2 and have their curved cutting edges 11 and 12 respectively terminating in a plane below the under side of the plate 4.

An open-ended cylindrical casing 13, is arranged about the stem 1, and is of such circumference that its lower end will fit in the space between the flange 7 and the upturned ends 6. Upon the inner surface of the casing 13, adjacent its upper end and at diametrically opposite points, are rigidly secured as at 13$^a$ and by any suitable means, curved rods 14. The upper ends of the curved rods 14 are connected to an elliptical ring 15, by means of bolts 16. The ring 15 surrounds the stem 1, and together with the rods 14, is capable of being moved longitudinally of the stem 1. Between the upper ends of the rods 14, the stem 1 is provided with a transverse opening 17, adapted for the reception of a removable pin 18, to the end of which is secured one end of chain 19. The opposite end of the chain 19 is secured to the stem 1, by means of an eye-bolt, as at 20.

In the use of my device, the same in its assembled form is placed upon the ground and rotated. The cutters 9 and 10 will loosen the ground, which will accordingly be forced into the cylinder 13. When the cylinder is filled, the device may be removed from the hole, and its contents readily emptied, by removing the pin 17, and raising the cylinder off of the plate 4.

Having fully described my invention, I claim:

The combination with a stem, of strips arranged at approximately right angles to each other and rigidly secured to said stem, said strips having their ends bent upwardly, a plate provided with a circumferential flange rigidly mounted upon said strips, said flange being suitably spaced from said upturned ends of the strips, portions of said plate being stamped to form cutters, the circumferential flange serving to suitably stiffen said plate and prevent the distortion of said cutters, and a removable cylinder mounted upon said plate and having one end disposed between said flange and upturned ends to form a snug union.

In testimony whereof I affix my signature in presence of two witnesses.

MARSHALL E. MILLER.

Witnesses:
T. J. MYERS,
A. F. LANGLEY.